March 8, 1927. 1,620,499
E. G. TEMPLETON
TIRE MACHINE
Filed April 20, 1921 7 Sheets-Sheet 1
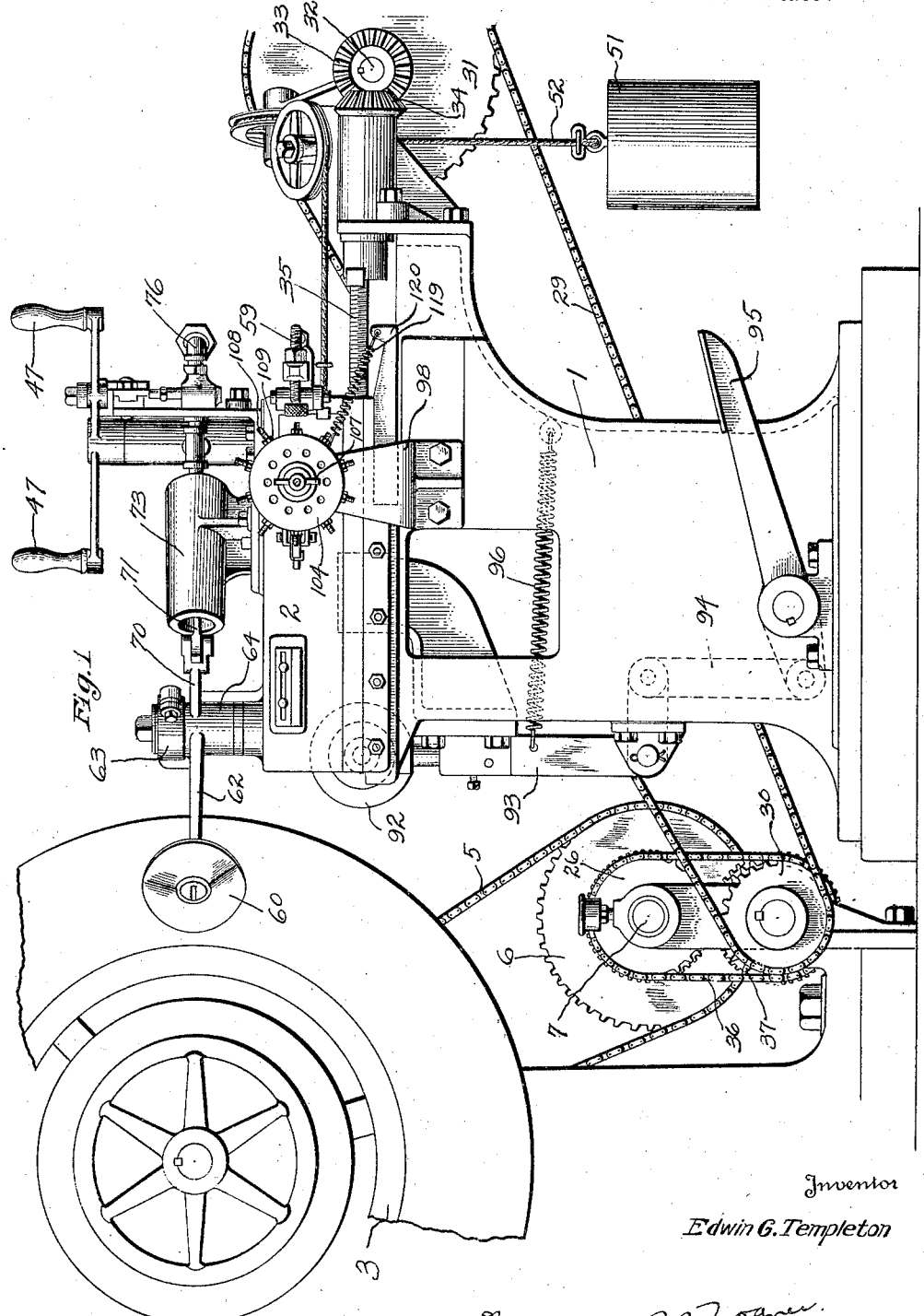
Inventor
Edwin G. Templeton

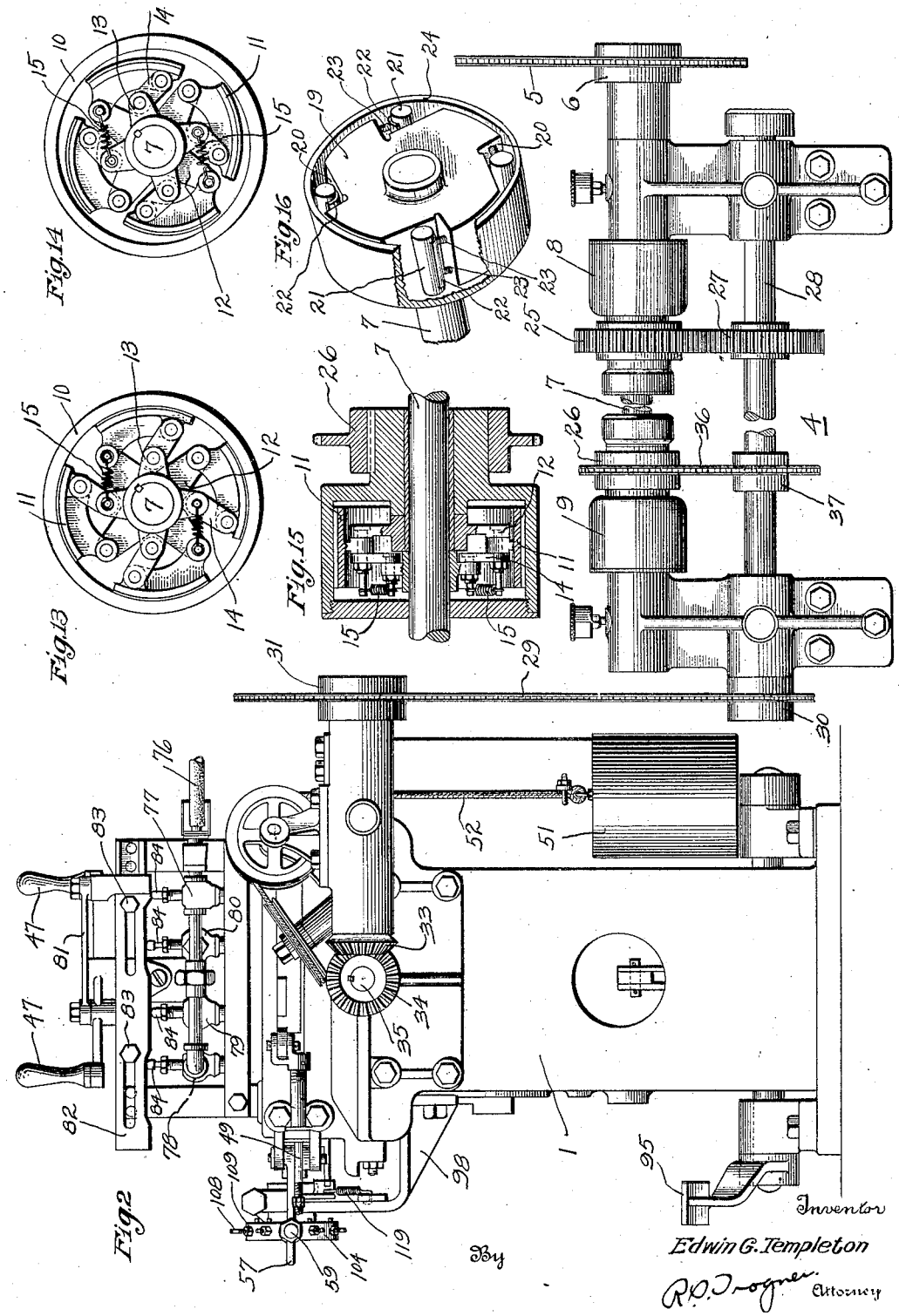

March 8, 1927.
E. G. TEMPLETON
TIRE MACHINE
Filed April 20, 1921
1,620,499
7 Sheets-Sheet 3
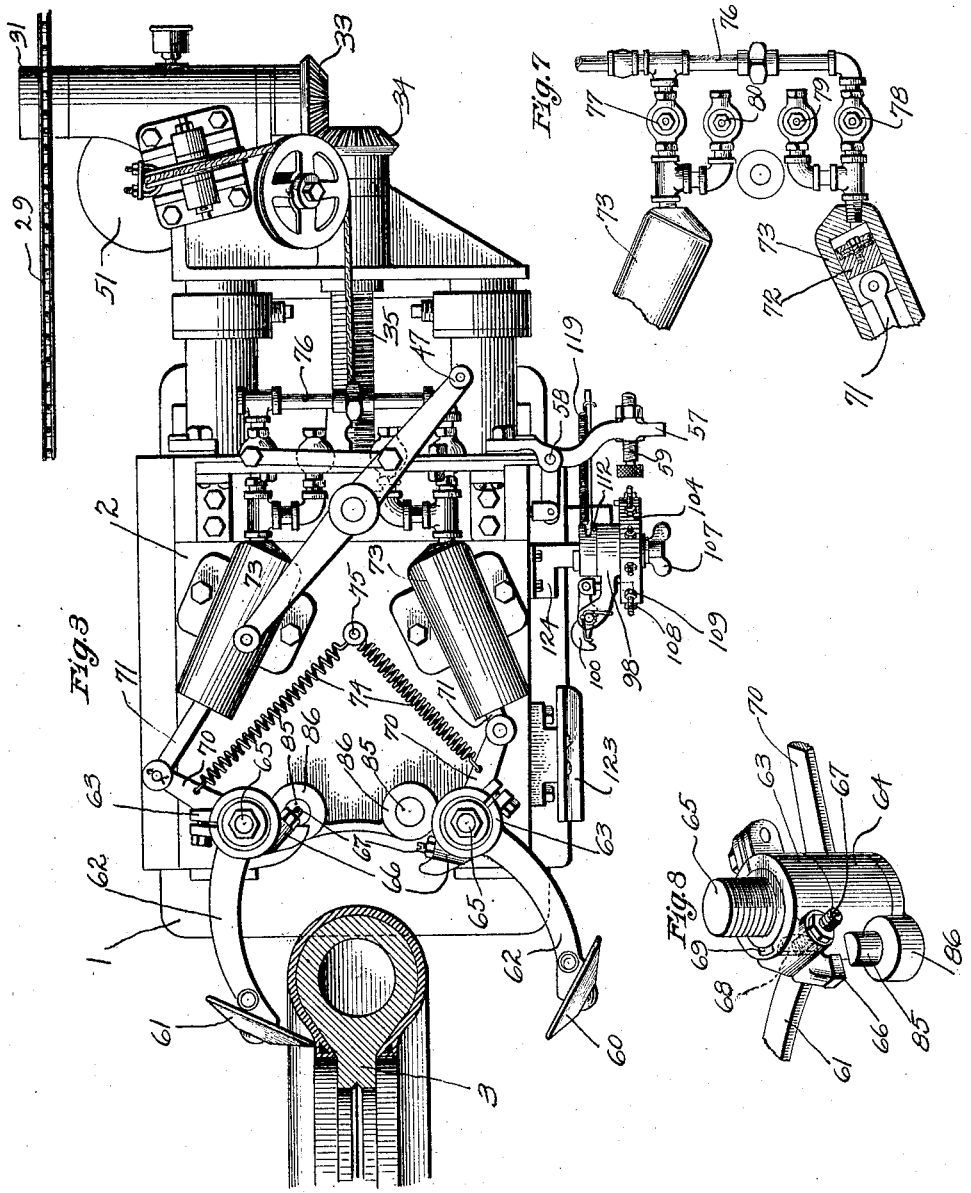
Inventor
Edwin G. Templeton
By
Attorney

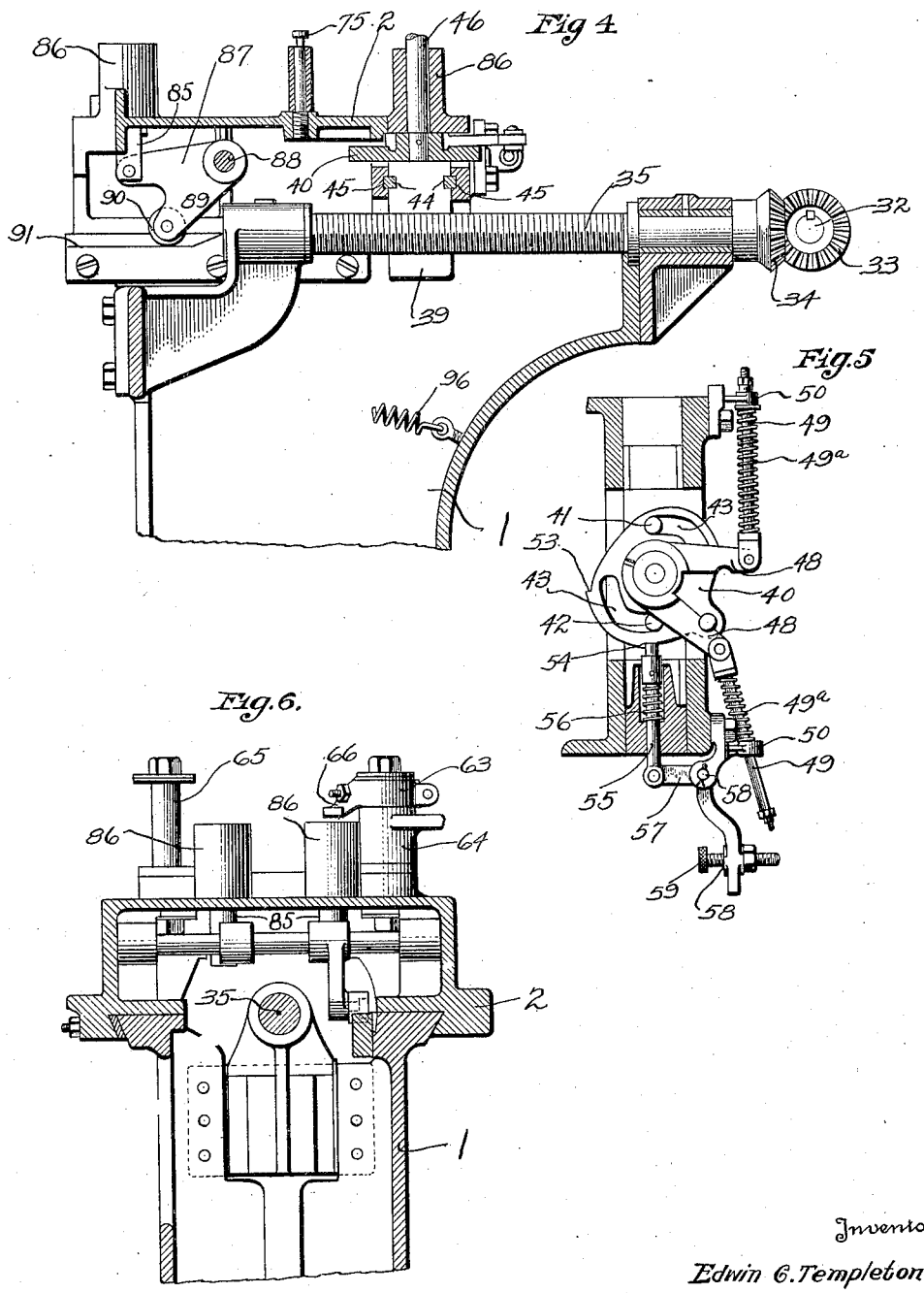

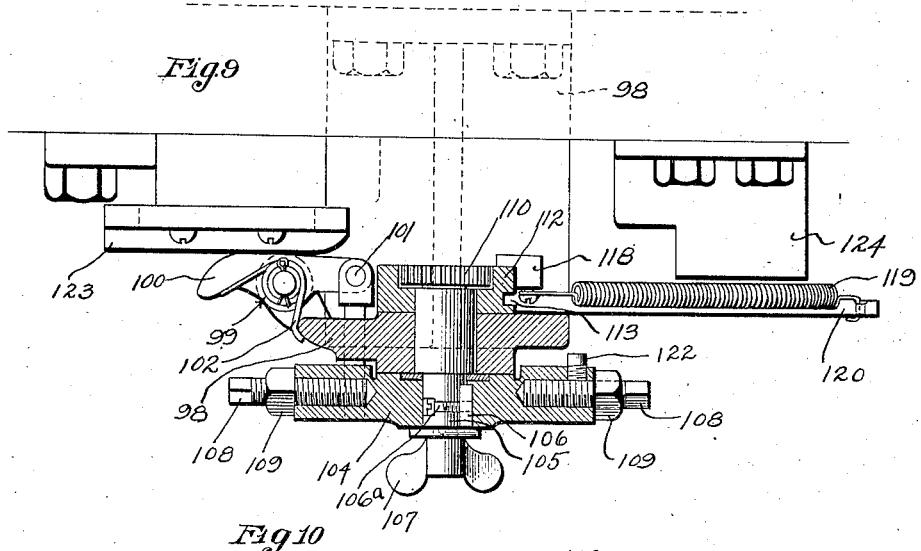
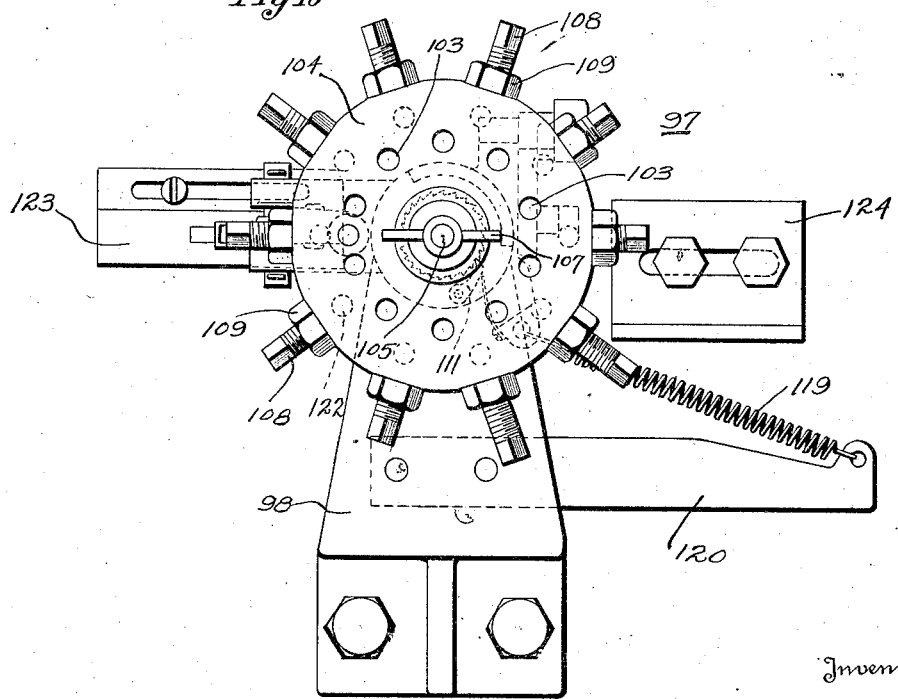

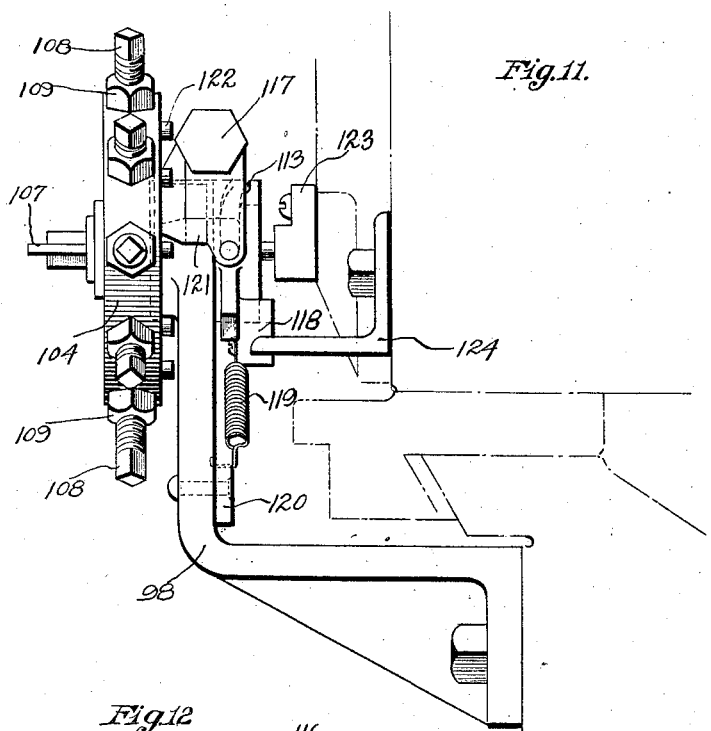
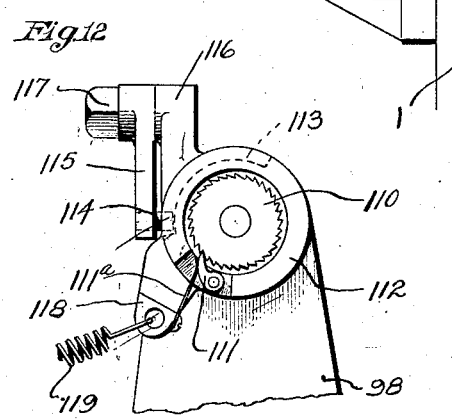

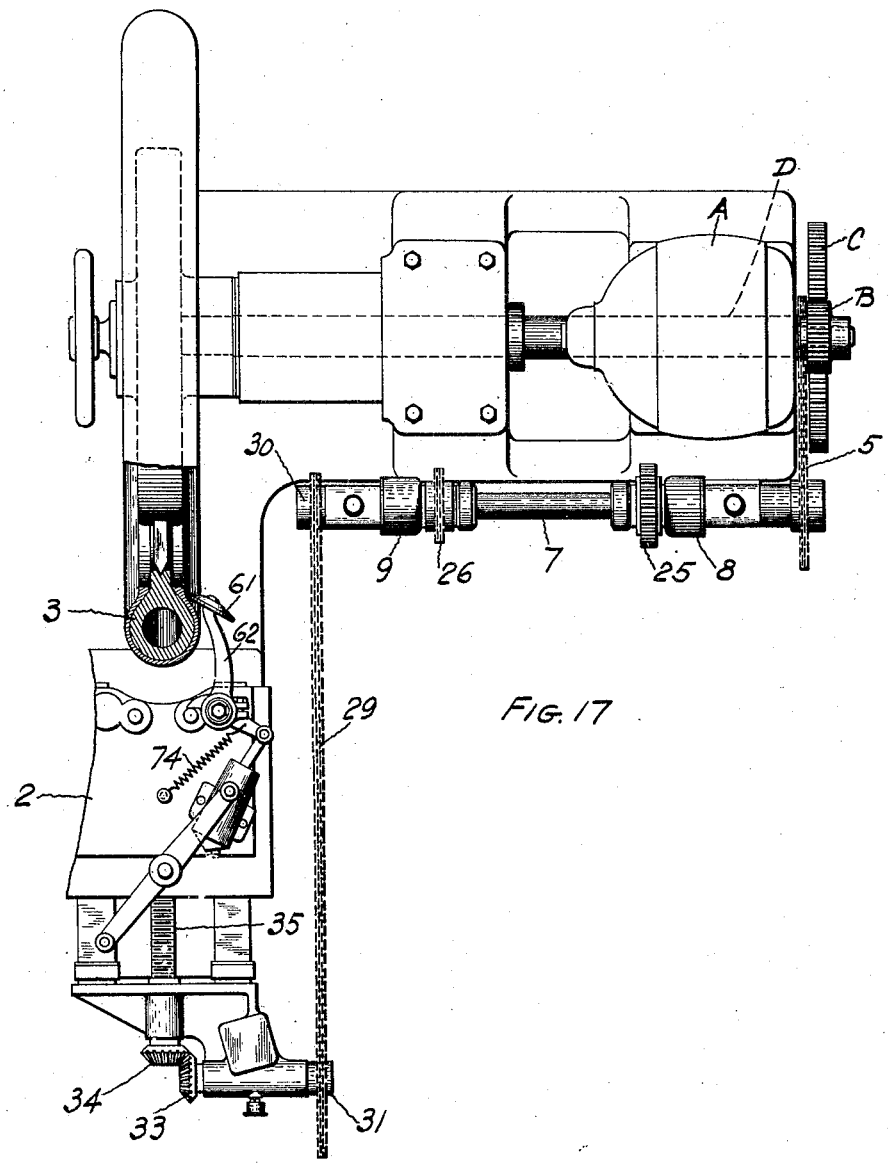

Patented Mar. 8, 1927.

1,620,499

UNITED STATES PATENT OFFICE.

EDWIN G. TEMPLETON, OF AKRON, OHIO, ASSIGNOR TO THE GOODYEAR TIRE & RUBBER COMPANY, OF AKRON, OHIO, A CORPORATION OF OHIO.

TIRE MACHINE.

Application filed April 20, 1921. Serial No. 462,969.

My invention relates to machines for building pneumatic tires and it has, for its primary object, the provision of a machine which shall be automatic in operation and which shall be particularly adapted for the construction of cord tires.

It has been found that cord tires possess a greater degree of strength and durability if the cords are disposed at an angle to the median line of the tire and the cords stitched down by stitcher elements, which, at all times, favor the lay of the cords or, in other words, insure the cords being properly stitched to the forming core without disturbing their proper position.

One object of my invention, therefore, resides in providing a tire building machine in which the driving mechanism, which rotates the mandrel or forming core, upon which the tire is built, shall be so connected to the stitcher carriage of the machine that the direction of rotation of the core may be reversed without interfering with the proper operation of the stitcher carriage.

A further object of my invention is to provide a suitable stop mechanism which shall effect a return movement of the stitcher carriage after one side of the cords has been stitched to the forming core, whereby the rotation of the core may be reversed, the stitcher carriage advanced to operative relation therewith and the other side of the cords stitched into place.

A still further object of my invention is to provide a tire machine with a suitable pneumatic control system for the stitcher elements, which may be advanced into operative relation with the forming core alternatively to effect stitching down of the cords.

With these and other objects in view, my invention will be more fully described, illustrated in the drawings, in which like numerals designate like parts, and then more fully pointed out in the appended claims.

In the drawings:

Fig. 1 is a side elevation of a tire machine, parts being broken away, constructed in accordance with my invention;

Fig. 2 is an end elevation of the tire machine shown in Fig. 1;

Fig. 3 is a plan view of the machine shown in the previous figures;

Fig. 4 is a sectional view, parts being broken away, showing details of the stitcher carriage and drive mechanism therefor;

Fig. 5 is a plan view, partially in section and partially in elevation, of a cam plate and a latching mechanism therefor utilized in conjunction with the operation of the stitcher carriage;

Fig. 6 is a transverse sectional view, parts being broken away, of the stitcher carriage and its supporting frame;

Fig. 7 is a detail view of air valves employed to control the operation of the stitcher elements;

Fig. 8 is a perspective view, parts being broken away, of a bearing adjustment for the stitcher arms which carry the stitcher elements;

Fig. 9 is a cross sectional plan view of a stop mechanism utilized to control the travel of the stitcher carriage;

Fig. 10 is a side elevation of the device shown in Fig. 9;

Fig. 11 is an end elevation of the device shown in the previous figures;

Fig. 12 is a detail view illustrating a ratchet mechanism embodied in the stop device shown in Figs. 9 to 11 inclusive;

Figs. 13, 14 and 15 are sectional views of a clutch that is utilized in the drive connections to the stitcher carriage;

Fig. 16 is a perspective view showing a modified form of clutch that may be utilized in the drive connection for the stitcher carriage; and Fig. 17 is a plan view, parts being broken away, illustrating particularly the drive motor and its connections.

My invention broadly comprehends the provision of a tire building machine in which the forming core is driven from the same source of power as the stitcher carriage and in which the stitcher carriage is so connected to the source of driving power as to permit of reversing the direction of rotation of the core without effecting the proper reciprocable movement of the stitcher carriage with respect to the core. Since my invention is particularly concerned with the construction of cord tires, although it is in no way limited to such construction, I have provided a mechanism to control the movement of the stitcher carriage which limits the forward movement of the carriage to a predetermined point in its travel and effects the return of the carriage at the same point in two successive operations.

For example, in the construction of cord tires, the layers of cords are disposed upon the forming core and one side is stitched down, after which the forming core is rotated in the opposite direction and the other side of the cords is stitched into place. In order to accomplish the stitching down of the two sides of the cords to the same degree at successive intervals, the stop mechanism is so constructed as to effect the return movement of the stitcher carriage at any point desired, whether in successive or alternative operations.

In order to afford a complete understanding of my invention, reference may be had to the drawings, particularly to Figs. 1 and 2, in which a complete assembly of the machine is shown, with the exception of the source of power for driving the core and the stitcher mechanism and the connection of the driving means to the core. However, this driving means may be of any suitable type, such as an electric motor, which may be directly geared to the core and connected, as will hereinafter be explained, to the stitcher carriage.

As shown in Figs. 1 and 2, the complete machine embodies an assembly of main parts among which is a supporting frame 1, which carries a stitcher carriage 2 in operative relation to a suitably supported core 3. Since a number of the features of construction of the machine herein disclosed are old in the art, a detailed description will not be given except as applied to those parts of the machine with which my invention is particularly concerned.

In Fig. 2 is shown a drive mechanism 4 which connects the stitcher carriage 2 to a suitable source of power. As here shown, a chain 5 connects a sprocket wheel 6, mounted upon a drive shaft 7, which carries a plurality of clutch members 8 and 9, to a driving motor A for the core.

The motor A may be, of course, driven in either direction by providing suitable electrical connections, as will be clearly understood. As indicated in Fig. 17, the motor has a spur gear B mounted upon its driving shaft which meshes with a larger gear C mounted upon an auxiliary shaft D that is directly connected to the core 3. The chain 5 is suitably mounted upon a sprocket wheel also mounted upon the shaft B in contiguous relation to the gear C.

The clutch members 8 and 9 may be of either the type shown in Figs. 13 to 15, inclusive, or of that shown in Fig. 16. For the purpose of illustration, the clutch, shown in Figs. 13 to 15, is applied to the machine and consists of a plurality of spiders concentrically mounted upon the drive shaft 7. A casing or drum 10, which is adapted to cooperate with brake shoes 11, carried by the spiders, is mounted to rotate freely upon the shaft 7 and be frictionally engaged by the brake shoes 11. A gear or sprocket wheel is mounted upon the casing 10 to provide for driving means.

As shown in Figs. 13 to 15 inclusive, the clutch includes a spider 12 which is freely mounted upon the shaft 7 and has its four arms pivotally connected to the respective ends of the four brake shoes 11. Another spider 13 is keyed, or otherwise secured, to the shaft and has its relatively shorter arms pivotally connected to links 14 which are, in turn, pivotally connected to the other ends of the brake shoes. A plurality of springs 15 are connected to the spider 13 and the brake shoes 11 to aid in causing engagement of the shoes with the drum.

In operation, the rotation of the shaft 7 in one direction effects such movement of the spider 13 with respect to the spider 12 as tend to cause alignment of the links 14 with the arm of the spider 13. The links 14 are of such length that an approach of such alignment results in engagement of the brake shoes 11 with the drum 10, thereby effecting rotation of the drum. The springs 15 aid in this action by reason of their disposition between the arms of the spiders. A rotation of the shaft in the opposite direction effects a disengagement of the shoes from the drum because the arms of the spiders tend to approach, which draws the links 14 from their locking position and releases the shoes. When the shoes are disengaged from the drum, the whole mechanism is free to rotate within the drum or casing.

The clutch shown in Fig. 16 is of more simple construction, but it is equally as effective in operation as the clutch above described. As here shown, the clutch comprises a central disc 19, which is mounted rigidly upon the shaft 7 and is provided with a series of substantially right-angular peripheral slots 20 adapted to receive cylindrical clutch members 21. The members 21 are disposed upon arcuate plates 22 carried by springs 23 partially disposed in openings provided in walls of the slots 20. It will be noted that the slots are so cut as to be sufficiently deep in the right angle thereof to receive the members 21 below the periphery of the member 19, but that any action tending to force the members 21 towards the edge of the slot, brings their surface above the periphery of the member 19. A casing 24, corresponding to the casing 10 of the clutch above described, is freely mounted upon the shaft 7 and may have a gear wheel or sprocket wheel secured thereto.

The operation of this clutch will be apparent since the rotation of the disc 19 in one direction causes the cylindrical members 21 to be forced, for example, into the deeper portion of the slot against the action of the springs 22 and they will not engage the casing 24, but rotation of the member in the opposite direction tends to force the cylindrical members against the casing 24, which action is assisted by the springs 23. The members 21 are, in effect, similar to brake shoes and cause the rotation of the casing by frictional engagement therewith.

The drive connection for the stitcher carriage will now be readily apparent since the clutch members 8 and 9 are of the type above described. The clutch 8 is mounted with a spur gear 25 upon the drive shaft 7 and the clutch 9 is also mounted with a sprocket wheel 26 upon the shaft. The gear 25 is adapted to mesh with a spur gear 27, mounted upon a countershaft 28, which is connected by a chain 29 passed over sprocket wheels 30 and 31 to a drive shaft 32 carrying a bevel gear 33 adapted to mesh with a bevel gear 34 mounted upon a threaded drive shaft 35 for the stitcher carriage 2. The sprocket wheel 26 is connected, by means of a chain 36, to a sprocket wheel 37 that is also mounted upon the counter-shaft 28.

From the foregoing, it will be seen that the rotation of the drive shaft 7, in such direction as to cause the clutch member 8 to operate and rotate the gear 25, will effect rotation of the gear 27 in the opposite direction and, therefore, will cause rotation of the counter-shaft 28 in the opposite direction from that of the drive shaft 7. If the direction of rotation of the shaft 7 be now reversed, the clutch member 8 is inoperative and the clutch member 9 causes the sprocket wheel 26 to be driven, thereby causing the shaft 28 to be driven in the same direction as the shaft 7. As a result, the operation of the shaft 28 is always in the same direction regardless of the direction of rotation of the drive shaft 7. Therefore, if the direction of rotation of the main connection of the source of power, which effects rotation of the core 3, be reversed, the drive for the stitcher carriage always operates to advance it toward the forming core.

The stitcher carriage 2 is mounted for reciprocable movement with respect to the core 3 and is operatively connected to the threaded drive shaft 35 by means of a split nut 39, which is connected to a cam plate 40 by pins 41 and 42, operating in cam slots 43. The split nut has guide lugs 44 secured to its separable sections, which slide in the guides 45 and maintain the separable sections of the nut in position when it is separated by means of the cam plate 40. The cam plate 40 is secured to a shaft 46, having control handles 47 mounted thereon above the stitcher carriage. A plurality of arms 48, which are connected to the cam plate, are pivotally connected to rods 49, which are enclosed by springs 49ᵃ and are freely supported at their ends by brackets 50 secured to the stitcher carriage.

As will be apparent, when the cam plate is in such position that the pins 41 and 42 occupy central positions in the cam slots 43, the split nut 39 will have its separable sections spaced from the drive shaft 35 and consequently permit of return movement of the carriage 2, which movement is effected by means of a weight 51 connected by a cable 52 to the carriage. One side of the cam plate 40 is provided with a plurality of notches 53 and 54, which are selectively engaged by a rod 55 slidably mounted upon the stitcher carriage 2 and is maintained in engagement with the cam plate 40 by means of a spring 56. The other end of the rod 55 is pivotally connected to a bell crank arm 57, which is pivotally mounted on the stitcher carriage, as indicated at 58. The free end of the arm 57 is provided with a threaded opening into which is fitted a set screw 59, the purpose of which will be apparent from the following description.

It will be understood that in order to effect an advancing movement of the carriage 2 towards the core 3, the handles 47 are turned in the direction desired to move the cam plate 40, as shown in Fig. 5, and cause the nut 39 to engage the drive shaft 35. The rod 55 engages one of the notches 53 or 54 in the cam plate and maintains it in position until a tripping mechanism effects the disengagement of the rod 55 with the cam plate 40, by engagement with the set screw 59 causing movement of the bell crank arm 57. One of the springs 49ᵃ, being compressed when the cam plate 40 is turned and the holding rod 55 disengaged from the cam plate, effects a return movement of the cam plate and consequently a disengagement of the nut 39 with the drive shaft 35, thus permitting the weight 51 to return the carriage to its initial position.

The advancing movement of the carriage 2 is, of course, primarily intended to bring stitcher elements 60 and 61 into operative relation with the core 3. The stitcher elements 60 and 61 are mounted upon arms 62, which are pivotally mounted upon the stitcher carriage 2. I have provided a particular mounting for the arms of the stitcher elements which is clearly shown in Fig. 8. As here shown, each stitcher arm 62 is connected to a collar 64 mounted upon a bearing member or post 65, the collar 64 having a reduced end upon which is fitted a split collar 63. The collar 63 is formed with an integral projection 66 and is provided with a threaded opening adapted to receive an adjusting screw 67. The adjusting screw 67 engages a key 68, which is disposed in a slot in the collar 64, a slot 69 permitting of movement of the split collar 63 with respect to the collar 64 when the screw 67 is advanced into engagement with the key 68. An arm 70, secured to the collar 64, is pivotally secured to a connecting rod 71 of a piston 72 disposed in a suitable cylinder 73. Movement of the connecting rod 71 actuates the stitcher arm 62 by turning the collar 64 connected thereto by the arm 70. The connecting arms 70 are each connected to a spring 74, which is in turn secured to a post 75 mounted upon the stitcher carriage, these springs tending to maintain the stitcher elements in an inoperative position with respect to the core. The cylinders 73 are each connected to an air conduit 76 by suitable inlet valves 77 and 78, valves 79 and 80 providing means for exhausting the cylinders.

The handles 47, above mentioned as connected to the cam plate 40, are also connected, by means of a link 81, to a cam bar 82 mounted for sliding movement upon bolts 83 secured to the stitcher carriage. The inlet and outlet valves for the cylinders 73 are suitably constructed to have their openings controlled by pins 84 adapted to engage the cam bar 82.

When the handles 47 are operated, as for example, to position the cam plate 40 as shown in Fig. 5, the cam bar 82 is moved to open the inlet valve to one of the cylinders 73, and in the case shown in Fig. 3, the stitcher 61 is being operated. The inlet valve 77, therefore, is opened and the exhaust valve 80 closed, while at the same time, the exhaust valve 79 is opened and the inlet valve 78 closed. The stitcher element 61 is advanced to operative engagement with the core 3 as the stitcher carriage is, at the same time, advanced toward the core. It will be apparent, therefore, that the operation of the handle 47 not only effects proper positioning of the stitcher element but also connects the stitcher carriage, by means of the split nut, to the drive shaft and effects its advancing movement.

The adjustment shown in Fig. 8, for the stitcher arms, is utilized to insure engagement, at the desired point and at the proper angle, of the stitcher elements with the forming core and after a suitable setting has been made, it is not ordinarily necessary to readjust this portion of the machine except for a different size of tire.

In order to insure that the stitchers be not turned too near the median line of the core at the outset of the stitching operation, a suitable stop is provided for each comprising a pin 85 mounted for sliding movement in a cylinder 86 and connected to a cam member 87. The cam members are pivotally mounted upon the stitcher carriage, as indicated at 88 and each has an arm 89 which has a roller 90 mounted thereon that is adapted to ride upon a guide 91 on the frame 1. It is necessary to employ the movable stop 85 in order that it may engage the flange 66 of the collar 63 at the outset of the operation. However, when the stitcher element has advanced toward the bead of the tire that is being formed, it must necessarily travel radially inwardly of the core and, therefore, occupies a position such that the arm carrying the stitcher must be turned past its initial position limited by the stop. The cam member 87, riding upon the guide 91, causes the pin 85 to project out of the cylinder 86 at the outset of the operation but, as the carriage advances, the pin is retracted and permits of further movement of the stitcher carrying arm 62.

It will be understood that the stitcher elements above mentioned do not stitch down the central portion of the cords, but this is accomplished in the usual manner by means of a tread roller 92, which is mounted upon an arm 93 that is pivotally connected to a link 94 operated by a foot pedal 95. The ordinary course of procedure, as followed in operating my present machine, is that customarily employed in machines of this character in that the cord or fabric layers are disposed upon the core 3 and it is rotated while the tread roller 92 is held in engagement therewith by depressing the foot pedal 95. A spring 96 is connected to the roller supporting arm 93 and to the frame 1 of the machine in order to maintain the roller 92 normally in inoperative position. After the central portion of the cords, or fabric, have been stitched into place, the stitcher elements are alternatively brought into operation, as above described, to stitch down the sides of the cords.

In order to cause the return movement of the carriage 2 after a stitcher has traversed the side of the core, a stop mechanism 97 is utilized which is clearly shown in Figs. 9 to 12 inclusive. As here shown, the stop mechanism comprises a bracket 98, which is secured to the frame 1 of the machine and is of substantially L-shape, as shown in Fig. 11. The upper, or unattached, end of the bracket 98 is provided with an opening and carries a latching mechanism 99. The latching mechanism 99 includes a pivotally mounted shoe 100 which is pivotally connected to a pin 101 and has a spring 102 so mounted about its pivot point as to engage the shoe and a portion of the bracket 98. The pin 101 is disposed in an opening in the bracket 98 and is adapted to engage in openings 103 provided in a disc 104, which is rigidly mounted upon a shaft 105 disposed in an opening in the bracket 98. The disc is maintained in position upon the shaft by means of a key 106 secured in position by a set screw 106$^a$ and a wing nut 107 is screwed upon the end of the shaft against the disc.

The disc 104 has a series of threaded openings provided in its periphery into which are screwed a series of adjustable screws 108 which are locked in position by means of nuts 109.

The disc 104 is adapted to turn with the shaft 105 upon the other end of which is mounted a ratchet wheel 110, which is engaged by a pawl 111 pivotally mounted upon a collar 112 enclosing the ratchet wheel, the pawl being held against the wheel by a leaf spring 111$^a$. The collar 112 is provided with a cam slot 113 in which a pin 114 is adapted to ride, which is secured to a cam bar 115 pivotally mounted upon an extension 116 of the bracket 98, as indicated at 117. The collar 112 has an arm 118 which is connected to a spring 119, the other end of which is connected to an arm 120 secured to the bracket 98. An arm 121 of the cam bar 115 is adapted to engage dowel pins 122 secured at intervals to the disc 104. A guide plate 123, which is secured to the forward end of the carriage 2, is adapted to engage the shoe 100 and a bracket 124 of L-shape is also secured to the carriage and adapted to engage the extension 118 of the collar 112.

The screws 108, secured to the disc 104, are intended to engage the set screw 59 in the bell crank arm 57 to effect a disengagement of the bar 55 in the notches 53 or 54 in the cam plate 40. This action, as above mentioned, effects the separation of the split nut 39 on the drive shaft 35 which permits of the return movement of the carriage 2. It will be appreciated, therefore, that in the construction, for example, of cord tires, it is desired to effect a return movement of the stitcher carriage at the same point at two successive intervals and, furthermore, the point at which the carriage is returned will be different during the course of construction of the tire because the stitcher elements travel along the side of the tire at varying distances according to whether the bead of the tire has been placed in position. It is desirable, therefore, that the trip mechanism be adjustable to provide for not only returning the stitcher carriage at different points in its travel, but also for permitting of a variation in the limitations of its movements when tires of different size are being constructed. The screws 108 may be adjusted according to the requirements of the operation but usually they are adjusted in sets of two which extend equal distances from the periphery of the disc.

At the beginning of the operation of constructing a tire, the disc is turned to present one of the set screws 108 in proper position for the first ply being stitched down and as the stitcher carriage is advanced, the guide plate 123 is disengaged from the shoe 100, which permits the spring 102 to cause the pin 101 to fit into one of the openings 103 and maintain the disc in position. As the carriage is advanced, the angle plate 124 engages the projection 118 and effects movement of the collar 112. The pin 114 advances along the cam slot 113 and so moves the bar 115 as to cause the arm 121 to be moved out of engagement with the contiguous pin 122 on the disc 104. When the carriage has travelled forward to a predetermined distance, the screw 108 engages the set screw 59 of the bell crank arm 57 which disconnects the drive to the carriage and permits the weight 51 to return it to its initial position. On account of the connection of the cam plate 40 to the handles 47, the releasing of the carriage at the same time effects such movement of the bar 82 as to open the exhaust valve of the cylinder from which a stitcher element is being held in operative position. The spring 74 returns the stitcher to its initial inoperative position.

As the carriage returns to its initial position, the plate 123 engages the shoe 100 and causes the pin 101 to be withdrawn from the opening 103 in the disc, thus releasing the disc from any locking mechanism since the arm 121 has been cammed out of engagement with the pin 122. The spring 119, which has been put under tension by the turning movement of the collar 112, retracts and thereby turns the collar, which, by means of the pawl 111 and ratchet wheel 110, effects rotation of the disc. The arm 121, which returns to its initial position with the return movement of the collar 112, engages the next pin 122 and maintains the disc in position with the succeeding screw 108 in alignment to engage the bell crank arm 57 when the stitcher carriage is again advanced.

It will be apparent from the foregoing description that the only manual operation in the machine is the turning or operation of one of the handles 47 to start the machine, after which the stitcher carriage is advanced, a stitcher element engages the material on the forming core and the stitcher carriage returns to its initial position after the stitcher element has advanced to a predetermined point along the side of the core. The pressure upon the stitcher elements is pneumatically maintained and after the machine has been properly adjusted for the particular size of tire being constructed, no further attention is necessary except to start its operation and place the material upon the core of the machine.

Although I have shown and specifically described a tire machine including a combination of elements that are provided by my invention, it is obvious that minor changes may be made in the assembly and construction of the elements without departing from the spirit or scope of the invention, and I desire, therefore, that no limitations shall be imposed except such as are indicated in the appended claims.

What I claim is:

1. The combination with a tire machine having a reversible drive for the tire core, of automatically selected means for driving the stitcher carriage always in the same direction by the driving means of the core.

2. The combination with a tire machine having a reversible drive for the tire core, of auxiliary clutch mechanisms which are selectively operated to effect movement of the stitcher mechanism into operative relation with the tire core irrespective of the direction of rotation of the core.

3. A machine for making tires comprising means for rotatably supporting a tire core, means for alternately rotating it in opposite directions, a stitcher mechanism, and a plurality of means for connecting the stitcher mechanism to the driving means of the core whereby advancing movement of the stitcher mechanism toward the core is effected irrespective of the direction of rotation of the core.

4. In a tire machine, a stitcher carriage, stitcher elements supported thereon, a forming core, means for effecting reciprocable movement of the carriage with respect to the core and pneumatic means for selectively operating the stitcher elements.

5. In a tire machine, a forming core, a stitcher carriage, stitcher elements supported thereon, means for effecting reciprocable movement of the carriage with respect to the core and automatically adjustable means for limiting the advancing movement of the carriage toward the core at any predetermined point in successive operations.

6. In a tire machine, a forming core, a stitcher carriage, stitcher elements supported thereon, means for effecting reciprocable movement of the carriage with respect to the core and automatic means for limiting the advancing movement of the carriage toward the core at different predetermined points in successive operations by adjustment of such means before the series of operations is begun.

7. In a tire machine, a forming core, a stitcher carriage, stitcher elements mounted thereon, means for effecting reciprocable movement of the carriage with respect to the core and means for automatically arresting the advancing movement of the carriage toward the core at the same position in only two successive operations of a series of operations.

8. In a tire machine, a forming core, a stitcher carriage, stitcher elements mounted thereon, automatically adjustable means for effecting reciprocable movement of the carriage with respect to the core, means for automatically arresting the travel of the stitcher carriage toward the core at predetermined points in successive operations and means for returning the carriage to its starting position.

9. In a tire machine, a forming core, a stitcher carriage, stitcher elements mounted thereon, means for effecting reciprocable movement of the carriage with respect to the core, means for automatically arresting the travel of the stitcher carriage toward the core at predetermined points in successive operations, said means including a rotatable member mounted upon the frame of the machine and a drive controlling mechanism adapted to be operated thereby.

10. In a tire machine, a forming core, a stitcher carriage, stitcher mechanism mounted thereon comprising a plurality of pivotally supported collars carrying stitcher arms and arms connected to a source of power, means for always effecting a movement of the carriage toward the core irrespective of its direction of rotation and means for limiting the travel of the carriage at automatically selected points in successive operations.

11. In a tire machine, a forming core, a stitcher carriage, stitcher mechanism mounted thereon comprising a plurality of pivotally supported collars adjustable with respect to each other carrying stitcher arms and arms connected to a source of power, means for always effecting a movement of the carriage toward the core irrespective of its direction of rotation and means for limiting the travel of the carriage at automatically selected points in successive operations.

12. In a tire machine, a forming core, a stitcher carriage, stitcher mechanism mounted thereon comprising a plurality of pivotally supported collars adjustable with respect to each other carrying stitcher arms and arms connected to a source of power, means for always effecting a movement of the carriage toward the core irrespective of its direction of rotation and means for limiting the travel of the carriage at any selected points in successive operations, said means including a rotatable element which is automatically adjusted at each operation of the carriage.

13. In a tire machine, a forming core, a stitcher carriage, a stitcher mechanism mounted thereon including stitcher elements, means for simultaneously connecting the carriage to the driving means for the core and positioning a selected stitcher element and means for limiting the travel of the stitcher carriage to any selected positions in a series of operations.

14. In a tire machine, a forming core, a stitcher carriage, a stitcher mechanism mounted thereon including stitcher elements, means for simultaneously connecting the carriage to the driving means for the core and positioning a selected stitcher element and means for limiting the travel of the stitcher carriage to any selected positions in a series of operations, said means including means for returning the stitcher element to its initial position.

15. In a tire machine, a forming core, a stitcher carriage, a stitcher mechanism mounted thereon including stitcher elements, manually controlled pneumatic means for simultaneously connecting the carriage to the driving means for the core and positioning a selected stitcher element and means for limiting the travel of the stitcher carriage to any selected positions in a series of operations, said means including means for returning the stitcher element to its starting position.

16. In a tire machine, a forming core, a stitcher carriage, stitcher elements mounted upon arms carried by split collars adjustably supported by additional collars pivotally mounted upon the carriage, pneumatic means for actuating the last mentioned collars, means for connecting the carriage to the driving means of the core to effect a movement of the carriage toward the core irrespective of the direction of rotation of the core and means for simultaneously limiting the movement of the carriage toward the core at any points in a series of operations and for returning the stitcher element to an inoperative position.

17. In a tire machine, a forming core, a suitably supported stitcher carriage having stitcher elements adjustably mounted thereon, driving means for moving the stitcher carriage on its support and rotating the core, means for connecting the stitcher carriage to the driving means and a device for controlling the connection of the carriage to the driving means comprising a bracket secured to the carriage support, a rotatable disc mounted on the bracket, means for maintaining the disc in an adjusted position and means for effecting a release of the disc actuated by movement of the carriage.

18. In a tire machine a forming core a suitably supported stitcher carriage having stitcher elements adjustably mounted thereon driving means for moving the stitcher carriage on its support and rotating the core, means for connecting the stitcher carriage to the driving means and a device for controlling the connection of the carriage to the driving means comprising a bracket secured to the carriage support, a rotatable disc mounted on the bracket, means for maintaining the disc in an adjusted position, means for effecting a release of the disc actuated by movement of the carriage and means for causing a limited movement of the disc.

19. In a tire machine, a forming core, a stitcher carriage movably supported upon a frame adjacent the core, stitcher elements mounted upon the carriage, means for connecting the stitcher carriage to a driving means and a device for controlling the connection between the carriage and driving means comprising a bracket secured to the frame, a rotatable disc mounted upon the bracket, screws adjustably disposed in openings provided in the periphery of the disc, means for holding the disc in adjusted positions, means for releasing it and means for effecting movement thereof actuated by movement of the stitcher carriage.

20. In a tire machine, a forming core, a stitcher carriage movably supported upon a frame adjacent the core, stitcher elements mounted upon the carriage, means for connecting the stitcher carriage to a driving means and a device for controlling the connection between the carriage and driving means comprising a bracket secured to the frame, a rotatable disc mounted upon the bracket, screws adjustably disposed in openings provided in the periphery of the disc at spaced intervals, means for holding the disc in adjusted positions, means for releasing it, means for effecting movement thereof actuated by movement of the carriage and means for limiting the movement of the disc.

In witness whereof, I have hereunto signed my name.

EDWIN G. TEMPLETON.